(12) United States Patent
Bennett et al.

(10) Patent No.: US 9,207,754 B2
(45) Date of Patent: Dec. 8, 2015

(54) ENABLING IMMERSIVE, INTERACTIVE DESKTOP IMAGE PRESENTATION

(75) Inventors: Eric Paul Bennett, Bellevue, WA (US); Rajeev Kumar Chand, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 13/277,648

(22) Filed: Oct. 20, 2011

(65) Prior Publication Data

US 2013/0104059 A1    Apr. 25, 2013

(51) Int. Cl.
*G06F 3/0481*    (2013.01)
*G06F 3/01*    (2006.01)

(52) U.S. Cl.
CPC ................ *G06F 3/01* (2013.01); *G06F 3/0481* (2013.01)

(58) Field of Classification Search
CPC .................................. G06F 3/0481; G06F 3/01
USPC .......................................... 715/765, 804, 867
See application file for complete search history.

(56) References Cited

U.S. PATENT DOCUMENTS

| 6,157,933 | A | 12/2000 | Celi et al. |
| 6,185,625 | B1 * | 2/2001 | Tso et al. ....................... 709/247 |
| 6,278,448 | B1 * | 8/2001 | Brown et al. ................. 715/866 |
| 6,546,397 | B1 | 4/2003 | Rempell |
| 7,003,734 | B1 | 2/2006 | Gardner et al. |
| 7,548,936 | B2 | 6/2009 | Liu et al. |
| 7,644,373 | B2 | 1/2010 | Jing et al. |
| 7,777,648 | B2 | 8/2010 | Smith et al. |
| 7,913,185 | B1 | 3/2011 | Benson et al. |
| 8,429,173 | B1 | 4/2013 | Rosenberg et al. |

(Continued)

FOREIGN PATENT DOCUMENTS

| CN | 101313353 A | 11/2008 |
| KR | 10-2008-0078333 A | 8/2008 |
| KR | 20100985068 B1 | 9/2010 |

OTHER PUBLICATIONS

Chartier, David, "Desky: drag and drop to change desktop wallpaper", published Feb. 21, 2007, archived by the Wayback Machine at http://web.archive.org/web/20081211204548/http://www.tuaw.com/2007/02/21/desky-drag-and-drop-to-change-desktop-wallpaper/ on Dec. 11, 2008, www.tuaw.com.*

(Continued)

*Primary Examiner* — Aaron Lowenberger
(74) *Attorney, Agent, or Firm* — Dave Ream; Jim Ross; Micky Minhas (57) ABSTRACT

Systems, methods, and computer-readable storage media for enabling immersive, interactive desktop image presentation are provided. Upon receiving a request for presentation of a background image of a search engine home page as a desktop image, the background image is transmitted for presentation on a desktop associated with a computing device. In embodiments, the background image, and likewise the desktop image, permits user interaction therewith. For instance, a user may zoom into the image, pan around the image or otherwise interact with enabled regions of the background and/or desktop image that offer additional content and/or navigate the user to another location where additional information may be found. In this way, the user is provided an immersive, interactive experience with the image whether at the search engine home page, the desktop, or both.

20 Claims, 8 Drawing Sheets

(56) References Cited

U.S. PATENT DOCUMENTS

| | | | | |
|---|---|---|---|---|
| 2001/0030651 | A1* | 10/2001 | Doyle | 345/581 |
| 2003/0074391 | A1 | 4/2003 | Carter et al. | |
| 2004/0100501 | A1* | 5/2004 | Dornback | 345/769 |
| 2004/0222987 | A1 | 11/2004 | Chang et al. | |
| 2005/0033747 | A1 | 2/2005 | Wittkotter | |
| 2005/0041045 | A1* | 2/2005 | Plut | 345/660 |
| 2007/0174790 | A1 | 7/2007 | Jing et al. | |
| 2007/0201761 | A1 | 8/2007 | Lueck | |
| 2008/0222273 | A1 | 9/2008 | Lakshmanan et al. | |
| 2008/0235187 | A1 | 9/2008 | Gade et al. | |
| 2008/0260269 | A1* | 10/2008 | Thiagarajan | 382/238 |
| 2009/0077205 | A1 | 3/2009 | Quinet et al. | |
| 2009/0132969 | A1* | 5/2009 | Mayer | 715/862 |
| 2009/0258681 | A1 | 10/2009 | Kishida et al. | |
| 2010/0080470 | A1 | 4/2010 | Deluca et al. | |
| 2010/0082661 | A1 | 4/2010 | Beaudreau | |
| 2011/0016376 | A1 | 1/2011 | Hinson | |
| 2011/0018896 | A1 | 1/2011 | Buzyn et al. | |
| 2011/0047145 | A1 | 2/2011 | Ershov | |
| 2011/0113315 | A1 | 5/2011 | Datha et al. | |
| 2011/0185287 | A1 | 7/2011 | Dharmarajan et al. | |
| 2011/0314419 | A1 | 12/2011 | Dunn et al. | |
| 2012/0002000 | A1 | 1/2012 | Guerrero | |
| 2012/0278171 | A1 | 11/2012 | Tang et al. | |

OTHER PUBLICATIONS

"How do I add a background image to my web page?", archived by the Wayback Machine at http://web.archive.org/web/20041020064641/http://www.angelfire.com/nm/thehtmlsource/jazzup/backgroundimage.html on Oct. 20, 2004, www.angelfire.com/n,/thehtmlsource/jazzup/backgroundimage.html.*

McCarth, Stuart, "Exploring User Interactions for an Online Photo-Sharing Application", published Apr. 2008, http://www.cs.bath.ac.uk/~mdv/courses/CM30082/projects.bho/2007-8/McCarthy-SA-dissertation-2007-8.pdf, 137 pages.

Allasia, et al., "Search on Audio-visual content Using Peer-to-peer Information Retrieval", published Jul. 23, 2007, http://acsi-project.haifa.il.ibm.com/papers/deliverables/sapir_d1_1.pdf, 80 pages.

Kroepfi, et al., "Efficiently Locating Photographs in Many Panoramas", In Proceedings of the 18th SIGSPATIAL International Conference on Advances in Geographic Information Systems, Nov. 2-5, 2010, pp. 119-128.

Zhang, et al., "Annotating and Navigating Tourist Videos", In Proceedings of the 18th SIGSPATIAL International Conference on Advances in Geographic Information Systems, Nov. 2-5, 2010, pp. 260-269.

Ay, et al., "Viewable Scene Modeling for Geospatial Video Search", In Proceedings of the 16th ACM International Conference on Multimedia, Oct. 26-31, 2008, pp. 309-318.

Beyond Ten Blue Links—Bing at SES London 2010, retrieved Aug. 2, 2011, http://community.microsoftadvertising.com/blogs/advertiser/archive/2010/02/16/beyond-ten-blue-links-ses-london-2010.aspx, 5 pages.

Non-Final Office Action mailed Feb. 11, 2013 regarding U.S. Appl. No. 13/341,350 9 pages.

PCT Search Report dated Mar. 29, 2013 regarding PCT/US2012/069605 11 pages.

PCT Search Report dated Mar. 29, 2013 regarding PCT/US2012/061231 10 pages.

Notice of Allowance mailed Jun. 11, 2013 regarding U.S. Appl. No. 13/341,350 10 pages.

Schwartz, Barry, "Google Home Page Automatically Changing Background Image on Jun. 10th", Published on: Jun. 10, 2010, Available at: http://searchengineland.com/google-home-page-automatically-changing-background-image-on-june-10th-43999, 9 pages.

Bose, Karthik, "Photosynth from Microsoft: Your Pictures in 3D", Published on: Aug. 21, 2008, Available at: http://techpp.com/2008/08/21/photosynth-from-microsoft-your-pictures-in-3d/, 7 pages.

Atismohanty, "Photosynth Technology", Published on: Sep. 30, 2009, Available at: http://churmura.com/general/photosynth-technology/18846/, 9 pages.

Lehtonen, et al., "Towards User-friendly Mobile Browsing", In Proceeding of the 2nd International Workshop on Advanced Architectures and Algorithms for Internet Delivery and Applications, ACM International Conference Proceedings Series, vol. 198, Article 6, 2006, pp. 7.

Chris Haig; "<object> image map browser test"; http://web.archive.org/web/20090527085812/http://haignet.co.uk/object-image-map.htm; 2 pages.

Non-Final Office Action mailed Oct. 9, 2013 in U.S. Appl. No. 13/277,507, 18 pages.

Final Office Action dated Oct. 23, 2014 in U.S. Appl. No. 13/277,507, 18 pages.

Haig, "<object> image map browser test"; http://web.archive.org/web/20090527085812/http://haignet.co.uk/object-image-map.htm; 2 pages.

Bing Image Archive; "http://www.istartedsomething.com/bingimages/?m=7&y=2009"; 1 page.

Non-Final Office Action mailed Oct. 9, 2013 regarding U.S. Appl. No. 13/277,507 18 pages First Office Action and Search Report Issued in Chinese Patent Application No. 201210589324.4 mailed May 21, 2015, 6 pages.

Second Office Action Issued in Chinese Patent Application No. 201210403288.8 mailed Jun. 18, 2015, 8 pages.

Non-Final Office Action dated Jul. 7, 2015 in U.S. Appl. No. 13/277,507, 19 pages.

* cited by examiner

ENABLING IMMERSIVE, INTERACTIVE DESKTOP IMAGE PRESENTATION

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. Initially upon a user expressing a desire to utilize a search utility, a home page associated with the particular search utility is presented that includes a search query input area into which the user may input keywords or phrases for which relevant search results are desired. Oftentimes, also presented is a background image for the search engine home page. Generally, such search utility home page background images are static images that may be visually appealing to the user but offer little else in terms of an immersive experience or to encourage attachment of the user with the search utility.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, enabling immersive, interactive desktop image presentation. Upon receiving a request for presentation of a background image of a search engine home page as a desktop image, the background image is transmitted for presentation on a desktop associated with a computing device. In embodiments, the background image, and likewise the desktop image, permits user interaction therewith. For instance, a user may zoom into the image, pan around the image or otherwise interact with enabled regions of the background and/or desktop image that offer additional content and/or navigate the user to another location where additional information may be found. In embodiments, portions of the background and/or desktop image may not be visible on the available display absent some type of user interaction with the image. In this way, the user is provided an immersive, interactive experience with the image whether at the search engine home page, the desktop, or both.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, enabling immersive, interactive desktop image presentation. Upon receiving a request for presentation of a background image of a search engine home page as a desktop image, the background image is transmitted for presentation on a desktop associated with a computing device. In embodiments, the background image, and likewise the desktop image, permits user interaction therewith. For instance, a user may zoom into the image, pan around the image or otherwise interact with enabled regions of the background and/or desktop image that offer additional content and/or navigate the user to another location where additional information may be found. In embodiments, portions of the background and/or desktop image may not be visible on the available display absent some type of user interaction with the image. In this way, the user is provided an immersive, interactive experience with the image whether at the search engine home page, the desktop, or both.

Accordingly, one embodiment of the present invention is directed to one or more computer-readable storage media storing computer-useable instructions that, when used by one or more computing devices, cause the one or more computing devices to perform a method for enabling immersive, interactive desktop image presentation. The method includes receiving a request for presentation of a background image of a search engine home page as a desktop image, transmitting the background image of the search engine home page for presentation on a desktop associated with a computing device, and enabling user interaction with the desktop image.

Another embodiment of the present invention is directed to one or more computer-readable storage media storing computer-useable instructions that, when used by one or more computing devices, cause the one or more computing devices to perform a method for enabling immersive, interactive desktop image presentation. The method includes receiving a request for presentation of a search engine home page on a display associated with a computing device and transmitting an image for presentation on a first portion of the display. The first portion comprises less than the whole display and the image comprises a portion of a larger image. The method further includes transmitting a plurality of additional image portions for presentation on a second portion of the display that differs from the first portion. The image and the plurality of additional image portions collectively comprise the larger image. Still further, the method includes receiving a request for presentation of the larger image as the desktop image, transmitting the larger image for presentation on a desktop associated with the computing device and enabling user interaction with the desktop image.

In yet another embodiment, the present invention is directed to a method for enabling immersive, interactive desktop image presentation. The method includes receiving a request for presentation of a search engine home page on a display associated with a computing device and, in response to the request, transmitting an image for display on a first portion of the display. The first portion of the display comprises less than the whole display and the image comprises a substantially centralized portion of a larger image. The method further includes transmitting a plurality of additional image portions for presentation on a second portion of the display that differs from the first portion, the image and the plurality of additional image portions collectively comprising the larger image. Still further, the method includes receiving a request for presentation of the larger image as a desktop image, transmitting the larger image for presentation on a desktop associated with the computing device, and enabling user interaction with the desktop image.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
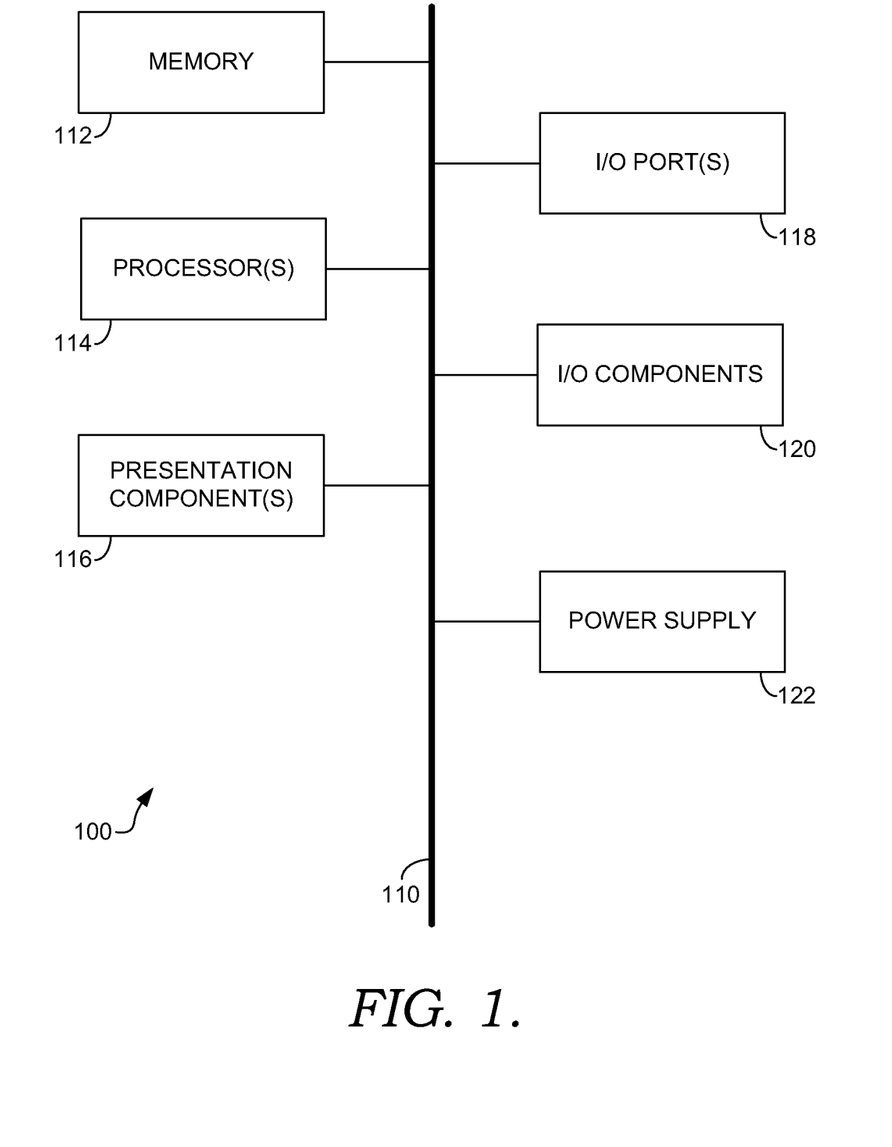
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, enabling immersive, interactive desktop image presentation. Upon receiving a request for presentation of a background image of a search engine home page as a desktop image, the background image is presented on a desktop associated with a computing device. In embodiments, the background image, and likewise the desktop image, permits user interaction therewith. For instance, a user may zoom into the image, pan around the image or otherwise interact with enabled regions of the background and/or desktop image that offer additional content and/or navigate the user to another location where additional information may be found. In embodiments, portions of the background and/or desktop image may not be visible on the available display absent some type of user interaction with the image. In this way, the user is provided an immersive, interactive experience with the image whether at the search engine home page, the desktop, or both.

Figure 2:
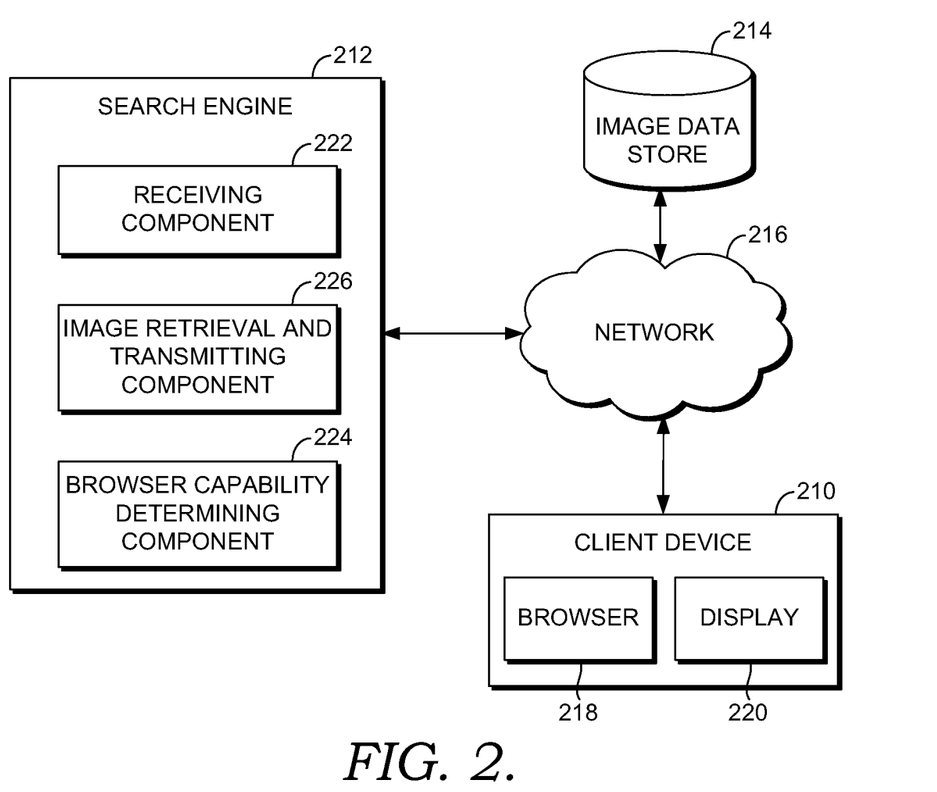
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which immersive, interactive search engine home pages and/or desktop images are enabled. As will be described in further detail below, embodiments of the present invention provide systems and methods for enabling such immersive search engine home pages and/or desktops by transmitting images for presentation on a display that permit user interaction therewith. In this way, the user receives a seamless transition from a first, static image to a larger image with which s/he can interact and is provided a rich, immersive experience at the search engine home page and, if desired, at the user's desktop. (It should be noted that while the phrase "search engine home page" is used herein, the functionality described is equally applicable to any online landing page. Any and all such variations, and any combination thereof, are contemplated to be within the scope of embodiments of the present invention.)

Among other components not shown, the computing system 200 generally includes a client device 210, a search engine 212, and an image data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, search engines and image data stores may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218 is configured to render a search engine home page having a static image and/or an interactive image as at least a portion of the background in association with the display 220 of the client computing device 210. The browser 218 is further configured to receive user input of requests for various web pages (including search engine home pages), receive user inputted search queries (generally inputted via a user interface presented on the display 220 and permitting alpha-numeric and/or textual input into a designated search box) and to receive content for presentation on the display 220, for instance, from the search engine 212. It should be noted that the functionality described herein as being performed by the browser 218 may be performed by any other application capable of rendering Web content. Any and all such variations, and any combination thereof, are contemplated to be within the scope of embodiments of the present invention.

The display 220 is configured to present various content including search engine home pages having interactive images associated therewith. The display 220 is further configured to present images on a desktop associated with the client computing device 210 that offer immersive, interactive experiences with explorable photo imagery, as more fully described below.

The search engine 212 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search server 212 includes a receiving component 222, a browser capability determining component 224, and an image retrieval and transmitting component 226. The illustrated search engine 212 also has access to an image data store 214. The image data store 214 is configured to store image data, that is, information associated with images. In various embodiments, such information may include, without limitation, raw image data, optimized image data, image data portions (e.g., image tiles, as more fully described below) and the like. In embodiments, the image data store 214 is configured to be searchable for one or more of the items stored in association therewith. It will be understood and appreciated by those of ordinary skill in the art that the information stored in association with the image data store 214 may be configurable and may include any information relevant to images configured for presentation on a search engine home page. The content and volume of such information are not intended to limit the scope of embodiments of the present invention in any way. Further, though illustrated as a single, independent component, the image data store 214 may, in fact, be a plurality of storage devices, for instance a database cluster, portions of which may reside in association with the search engine 212, the client computing device 210, another external computing device (not shown), and/or any combination thereof.

The receiving component 222 of the search engine 212 is configured to receive requests for presentation of search engine home pages. Typically, such a request is received via a browser associated with a client computing device, for instance, the browser 218 associated with the client computing device 210. The receiving component 222 of the search engine 212 further is configured to receive requests for presentation of explorable photo images presented in association with a search engine home page as desktop images. Typically, such a request is received via a toggle control configured to navigate between a search engine home page and a desktop display.

Image data stored in association with the image data store 214 may take any of a number of different forms. For instance, such image data may be a single image or multiple images placed together such that the result appears to be a contiguous single image. Additionally, such image data may be in the form of a panorama or another explorable photo image (e.g., a synth). As utilized herein, the term "panorama" refers to a wide-angle view or representation of an image such that it appears to a person viewing the larger image that s/he is standing in one location and viewing toward different directions from a single vantage point. As utilized herein, the term "synth" refers to image data that is collectively assembled and presented such that it appears as though the viewer was looking at a the same object from a variety of different directions or vantage points. Regardless of the image data source, embodiments of the present invention break down the image data into image data portions or tiles such that the data may be processed in smaller chunks that contain less information. Such permits faster and more efficient image data processing. Accordingly, the image data store 214 is further configured to store image data portions or tiles.

Upon receiving a request for presentation of a search engine home page, the browser capability determining component 224 is configured to determine whether a browser associated with a requesting client computing device is capable of receiving large, high-resolution, interactive images as at least a portion of the background of a search engine home page and of presenting the same. In embodiments, a preference determining component (not shown) may be present that is configured to determine whether any applicable user-preference settings permit or hinder such interactive image presentation as at least a portion of the background of a search engine home page.

The image retrieval and transmitting component 226 is configured to receive image data (e.g., from the image data store 214) and transmit such image data for presentation as at least a portion of the background of a search engine home page, for instance, to a browser associated with a client computing device. The image retrieval and transmitting component 226 further is configured to transmit image data for presentation as a desktop image, for instance, a desktop associated with the client computing device 210. If it is determined by the browser capability determining component 224 that the browser associated with the requesting client computing device is not capable of receiving large, high-resolution, interactive images as at least a portion of the background of a search engine home page or desktop and/or of presenting the same, the image retrieval and transmitting component 226 is configured to retrieve a static image generally configured for presentation on a portion of the available display that is less than the entire display and to transmit such image for presentation. If, however, it is determined that the browser associated with the requesting client computing device is capable of receiving image data that provides an immersive, interactive user experience with the search engine home page, the image retrieval and transmitting component 226 further is configured to transmit high-resolution, large image data for presentation as at least a portion of the background for search engine home pages.

Figure 3:
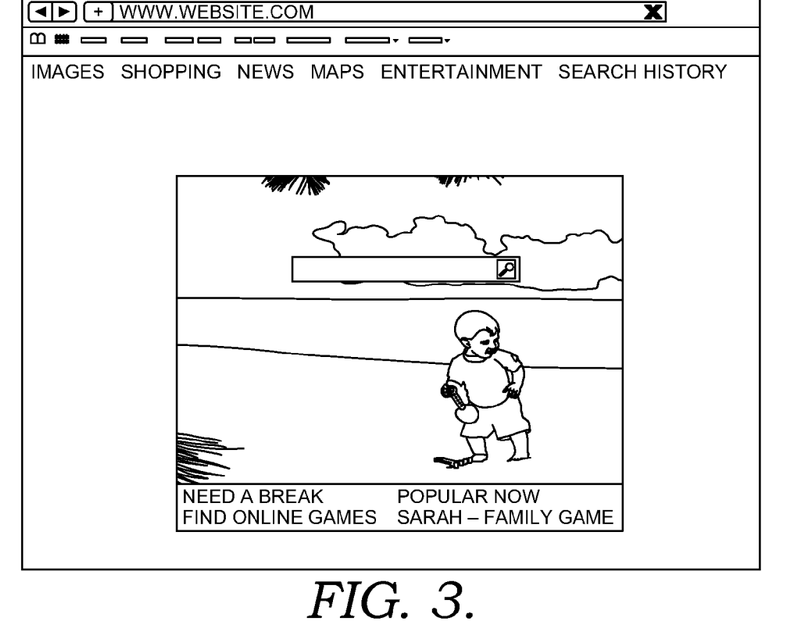
FIG. 3 is a schematic diagram showing an exemplary screen display of a search engine home page prior to loading and transmission of surrounding image portions, in accordance with an embodiment of the present invention.

Embodiments of the present invention strive to achieve a "parity" experience to an existing search engine home page but then transition to a richer, interactive experience that offers the ability to show and/or interact with larger images, panoramic images, and/or other explorable photo images (e.g., synths). In the initial parity experience, the image retrieval and transmitting component 226 transmits an image or image portion for presentation on the display of a client device (e.g., client computing device 210) such that to the user, the presented search engine home page appears as s/he has come to expect. With reference to FIG. 3, a schematic diagram is illustrated showing an exemplary screen display of a search engine home page prior to loading and transmission of surrounding image portions, in accordance with an embodiment of the present invention.

Oftentimes, high-quality and/or high-resolution images are too large for efficient and timely transmission over the Internet. However, it is desirable that the images be able to load rapidly so as to provide user functionality as quickly as possible. As such, within the scope of embodiments hereof, it may be desirable to optimize the image data, for instance, via compression techniques and/or resolution-altering techniques. In embodiments, such functionality may be accomplished utilizing, e.g., CSS, JavaScript, and common image file formats that can run across a wide breadth of browsers. Additionally, in embodiments, it is desirable to provide the optimal user experience based on the bandwidth or connection speed associated with the requesting computing device. Any and all such variations, and any combination thereof, are contemplated to be within the scope of embodiments of the present invention.

Figure 4:
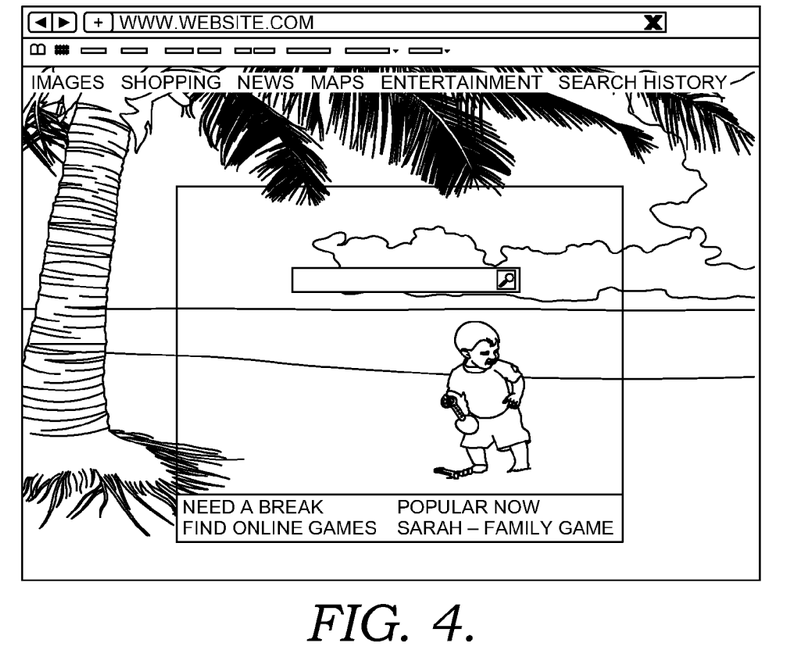
FIG. 4 is a schematic diagram showing an exemplary screen display of a search engine home page during or subsequent to loading and transmission of surrounding image portions, in accordance with an embodiment of the present invention.

With reference back to FIG. 2, subsequent to (or substantially simultaneously with) loading the initial image and transmitting such image data for presentation on the display 220, embodiments of the present invention involve loading image data associated with a larger image (e.g., a panoramic image or other explorable photo image) in the background. In embodiments, the search engine 212 may be downloading a different form of image data (e.g., multi-resolution image data or "tiles") in the background which can be used to display interactive large flat images, cylindrical panoramic images, spherical panoramic images, or other explorable photo images (e.g., synths). One exemplary technology that may be utilized to achieve this functionality is the DeepZoom/SeaDragon technology owned by Microsoft Corporation of Redmond, Wash. and currently used within the PHOTOSYNTH branded services and applications. The search engine home page appears to load as users have come to expect, however as the image tiles load off screen, they fade in around portions of the available display not covered by the initial image and provide users with the functionality to pan around and zoom deeper into the larger image. With reference to FIG. 4, a schematic diagram is illustrated showing an exemplary screen display of a search engine home page during or subsequent to loading and transmission of surrounding image portions, in accordance with an embodiment of the present invention.

The concept of when to fade in the pixel data of the larger image is based on a tradeoff that exists for multi-resolution image viewers. Multi-resolution formats iteratively load in progressive quality. As such, it may not be desirable for the highest pixel quality to be loaded before fading in the image data loaded for presentation on the available display not covered by the initial image. In such embodiments, the image data will continue to iteratively load and refine itself and improve until it reaches maximum quality. If a high resolution initial image is presented, it may be desirable to keep such image data onscreen as long as possible, acting as a "fovea" around which fuzzier imagery exists. In embodiments, user focus may continue to be kept on the high resolution initial image by fading out the border slightly even once it is fully loaded.

In embodiments, as the image tiles load for presentation around portions of the available display not covered by the initial image, the area around the search engine homepage image (i.e., the "border") is at least partially obscured (e.g., fades) to show the extents of a larger, interactive image once it is sufficiently loaded. This uses up more of the available display and therefore is a more impressive view of the image. However, it remains static.

In other embodiments, as the larger image (comprising the initial image and the image tiles loaded for presentation on the available display surrounding the initial image) is sufficiently loaded, it is faded in and interaction therewith is enabled. For instance, in embodiments, the larger image may become draggable to explore a cylindrical or spherical panorama that can be dragged up, down, left and right, to reveal additional information, and may be zoomed (e.g., via a mouse wheel) in an out to reveal more or less of the information. In embodiments, the larger image may "wrap around" so the user may go a full 360 degrees and end up where they started in the panorama.

In embodiments, the image includes one or more interactive regions. Upon user interaction with a particular interactive region, additional information and/or images are presented. The additional information and/or images generally relate in some way to the underlying image associated with the particular interactive region. The interactive regions are anchored to a pixel location within the larger image to highlight specific aspects of each interactive image. These interactive regions may provide details about the content within the interactive image, as well as send users to queries and search verticals available within the search engine. With the introduction of scrollable and interactive content, the interactive regions in the larger image are anchored to pixel coordinates in the larger image, meaning that panning and zooming within the image will move the visual location of those interactive regions as well. This allows an interactive region that is located over a penguin in an Antarctic panorama, for instance, to always hover over that penguin, regardless of how the user moves through the panorama. This also means that the interactive region may not appear onscreen at all if the currently-viewed portion of that panorama does not include the anchored pixels.

In addition to interactive regions activated upon user interaction therewith, embodiments of the present invention may provide interactive functionality without express user initiation. That is, automatic (i.e., without user initiation) slight image movement, for instance, panning back and forth, and/or highlighting of controls, may occur to alert or remind the user that additional functionality with respect to the image is available and to entice the user to engage in the interactive experience offered. Any and all such variations, and any combination thereof, are contemplated to be within the scope of embodiments of the present invention.

Figure 5:
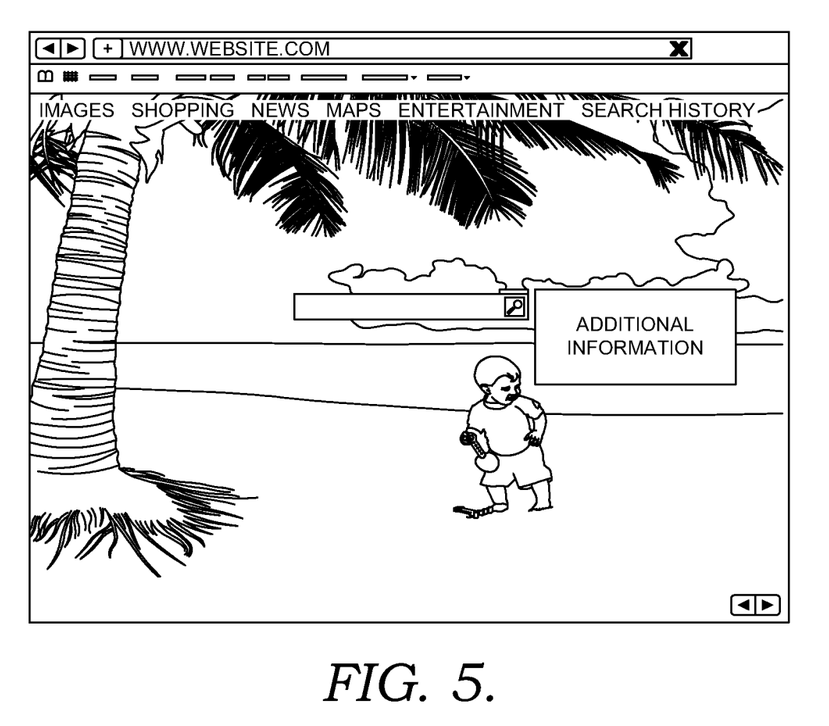
FIG. 5 is a schematic diagram showing an exemplary screen display of a search engine home page, in accordance with an embodiment of the present invention, having an interactive region capable of providing additional content.

With reference to FIG. 5, a schematic diagram is illustrated showing an exemplary screen display of a search engine home page, in accordance with an embodiment of the present invention, the search engine home page having an interactive region capable of providing additional content.

Figure 6:
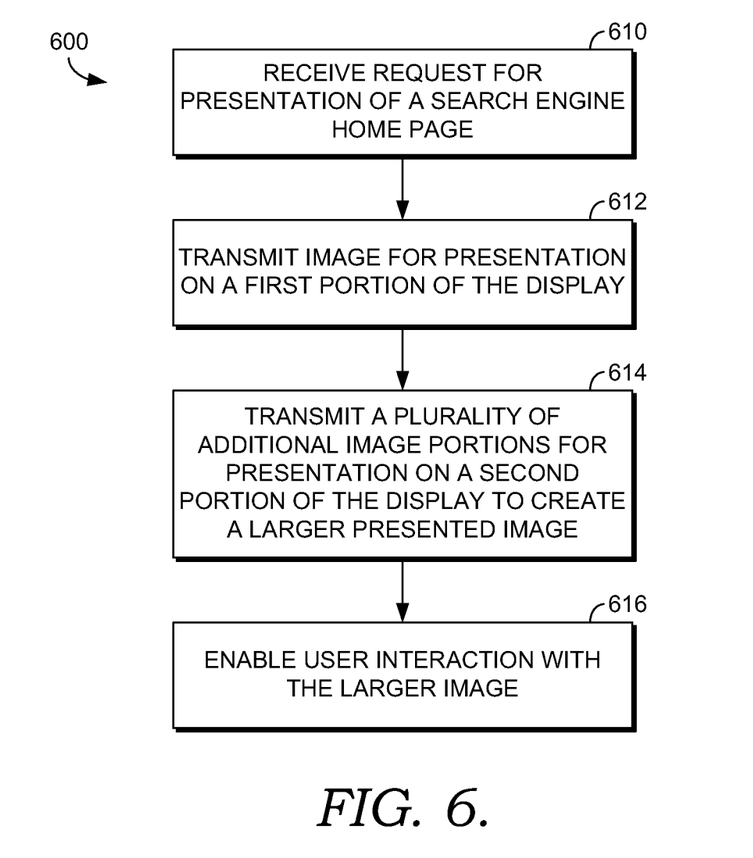
FIG. 6 is a flow diagram showing an exemplary method for enabling immersive, interactive search engine home pages, in accordance with an embodiment of the present invention.

With reference to FIG. 6, a flow diagram is provided that illustrates an exemplary method 600 for enabling immersive, interactive search engine home pages, in accordance with an embodiment of the present invention. Initially, as indicated at block 610, a request for presentation of a search engine home page on a display is received, for instance, from a browser associated with a client device (e.g., the client computing device 210 of FIG. 2). In response to receiving the request, an image is transmitted for presentation on a first portion of the display associated with the requesting device (e.g., the display 220 of the computing device 210 of FIG. 2), as indicated at block 612. The transmitted image comprises a portion of a larger image but may appear as a complete image in its own right. Subsequently (or substantially simultaneously), a plurality of additional image portions is transmitted for presentation on a second portion of the display associated with the requesting device, the second portion differing from the first portion. This is indicated at block 614. In embodiments, the first portion may comprise a substantially centralized portion of the available display and the second portion may comprise an area of the available display surrounding the first portion. (As utilized herein, the term "substantially centralized" refers to portions of a display or image for which there are additional portions surrounding the substantially centralized portion in all directions and is not meant to limit embodiments hereof to an actual center portion. That is, the additional portions surrounding the substantially centralized portion may be of different sizes or proportions with respect to one another.) The image and the additional image portions collectively comprise the larger image. As indicated at block 616, user interaction is enabled with respect to the larger image. Such user interaction may include, without limitation, panning, zooming, and the like.

Figure 7:
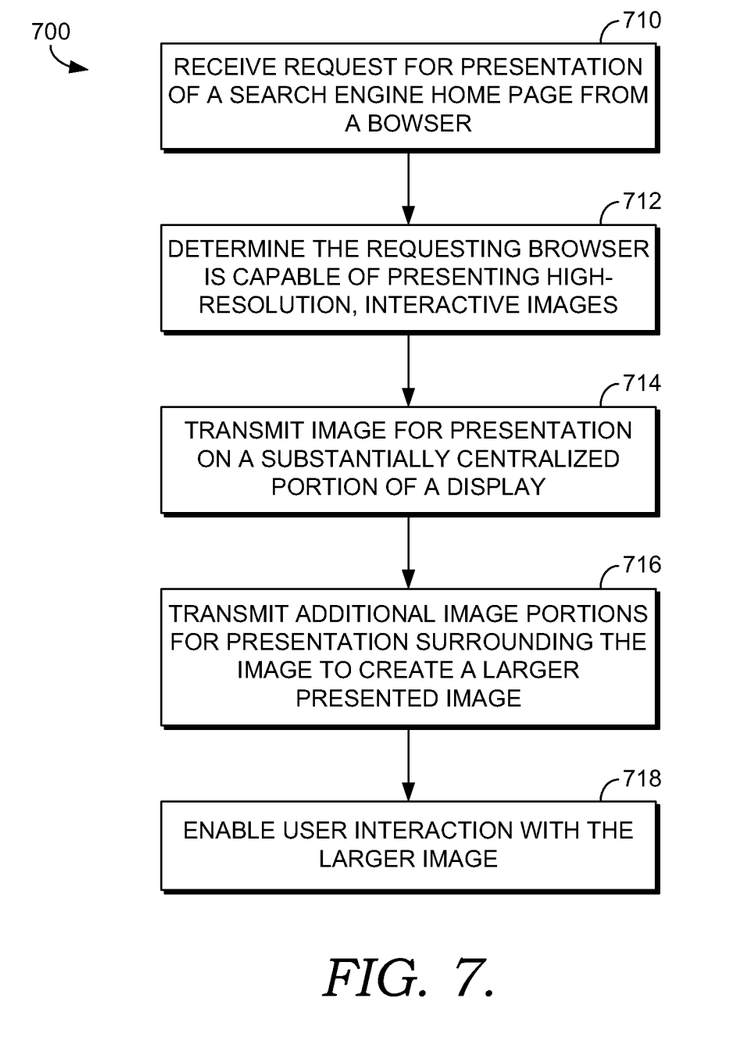
FIG. 7 is a flow diagram showing another exemplary method for enabling immersive, interactive search engine home pages, in accordance with an embodiment of the present invention.

Turning now to FIG. 7, a flow diagram is illustrated showing another exemplary method 700 for enabling immersive, interactive search engine home pages, in accordance with an embodiment of the present invention. Initially, as indicated at block 710, a request for presentation of a search engine home page on a display is received from a browser associated with a client device (e.g., the browser 218 associated with the client computing device 210 of FIG. 2). Upon receipt of the presentation request, it is determined whether the requesting browser is capable of presenting high-resolution, interactive images such as panoramic images and other explorable photo images (e.g., synths). This is indicated at block 712. It should be noted that, although not shown in FIG. 7, in accordance with embodiments hereof, it is desirable to provide the optimal user experience based on the bandwidth or connection speed associated with the requesting computing device. As such, it may additionally be determined whether the bandwidth or connection speed associated with the requesting computing device permits optimal presentation of high-resolution, interactive images.

If it is determined that the requesting browser is capable of presenting high-resolution, interactive images (and, if applicable, that the bandwidth or connection speed associated with the requesting computing device permits optimal presentation of such images), an image is transmitted for presentation on a substantially centralized portion of the display associated with the requesting device (e.g., the display 220 of the computing device 210 of FIG. 2), as indicated at block 714. The transmitted image comprises a substantially centralized portion of a larger image but may appear as a complete image in its own right. Subsequently (or substantially simultaneously), a plurality of additional image portions is transmitted for presentation on a second portion of the display associated with the requesting device, the second portion differing from the substantially centralized first portion. This is indicated at block 716. In embodiments, the second portion may comprise an area of the available display surrounding the substantially centralized first portion. The image and the additional image portions collectively comprise the larger image. As indicated at block 718, user interaction is enabled with respect to the larger image. Such user interaction may include, without limitation, panning, zooming, and the like.

Embodiments of the present invention also enable immersive, interactive desktop image presentation. In some such embodiments, upon receiving a request for presentation of a background image of a search engine home page as a desktop image, the background image is transmitted for presentation on a desktop associated with a computing device. In embodiments, the background image, and likewise the desktop image, permits user interaction therewith. For instance, a user may zoom into the image, pan around the image or otherwise interact with enabled regions of the background and/or desktop image that offer additional content and/or navigate the user to another location where additional information may be found. In embodiments, portions of the background and/or desktop image may not be visible on the available display absent some type of user interaction with the image. In this way, the user is provided an immersive, interactive experience with the image whether at the search engine home page, the desktop, or both.

Figure 8:
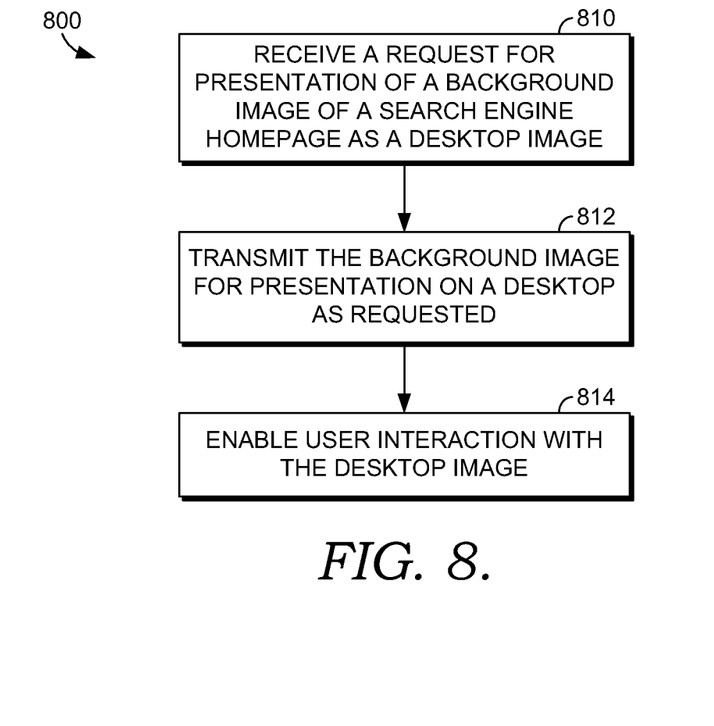
FIG. 8 is a flow diagram showing an exemplary method for enabling immersive, interactive desktop image presentation, in accordance with an embodiment of the present invention.

Turning now to FIG. 8, a flow diagram is illustrated showing an exemplary method 800 for enabling immersive, interactive desktop image presentation, in accordance with an embodiment of the present invention. Initially, as indicated at block 810, a request for presentation of a background image of a search engine home page as a desktop image is received, for instance, from the browser 218 associated with the client computing device 210 of FIG. 2. Upon receipt of the presentation request, the background image of the search engine home page is transmitted for presentation on a desktop associated with a computing device (e.g., computing device 210 of FIG. 2), as indicated at block 812. As indicated at block 814, user interaction is enabled with respect to the desktop image. Such user interaction may include, without limitation, panning, zooming, and the like.

Figure 9:
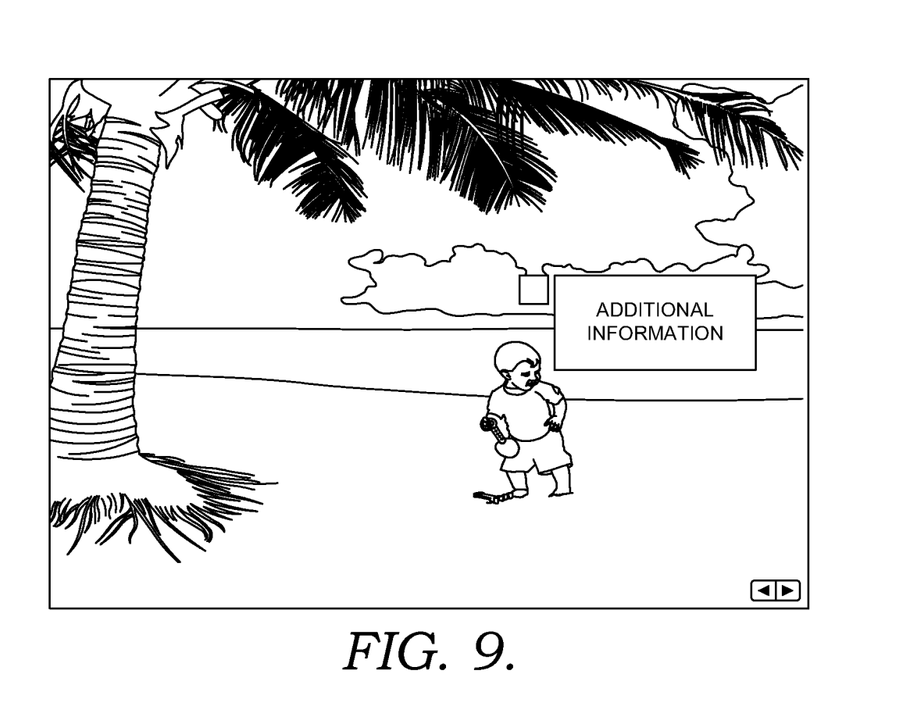
FIG. 9 is a schematic diagram showing an exemplary screen display of a desktop associated with a computing device, in accordance with an embodiment of the present invention.

With reference to FIG. 9, a schematic diagram is illustrated showing an exemplary screen display of a desktop associated with a computing device, in accordance with an embodiment of the present invention, the desktop image having an interactive region capable of providing additional content. The bottom right corner of the screen display illustrates an exemplary toggle control (in the form of arrows pointing in opposite directions) interaction with which facilitates navigation between the desktop associated with the computing device and the search engine home page. It will be understood by those of ordinary skill in the art that any number of toggle controls, presented or accessible via hardware components and the like may be utilized within the scope of embodiments of the present invention.

Figure 10:
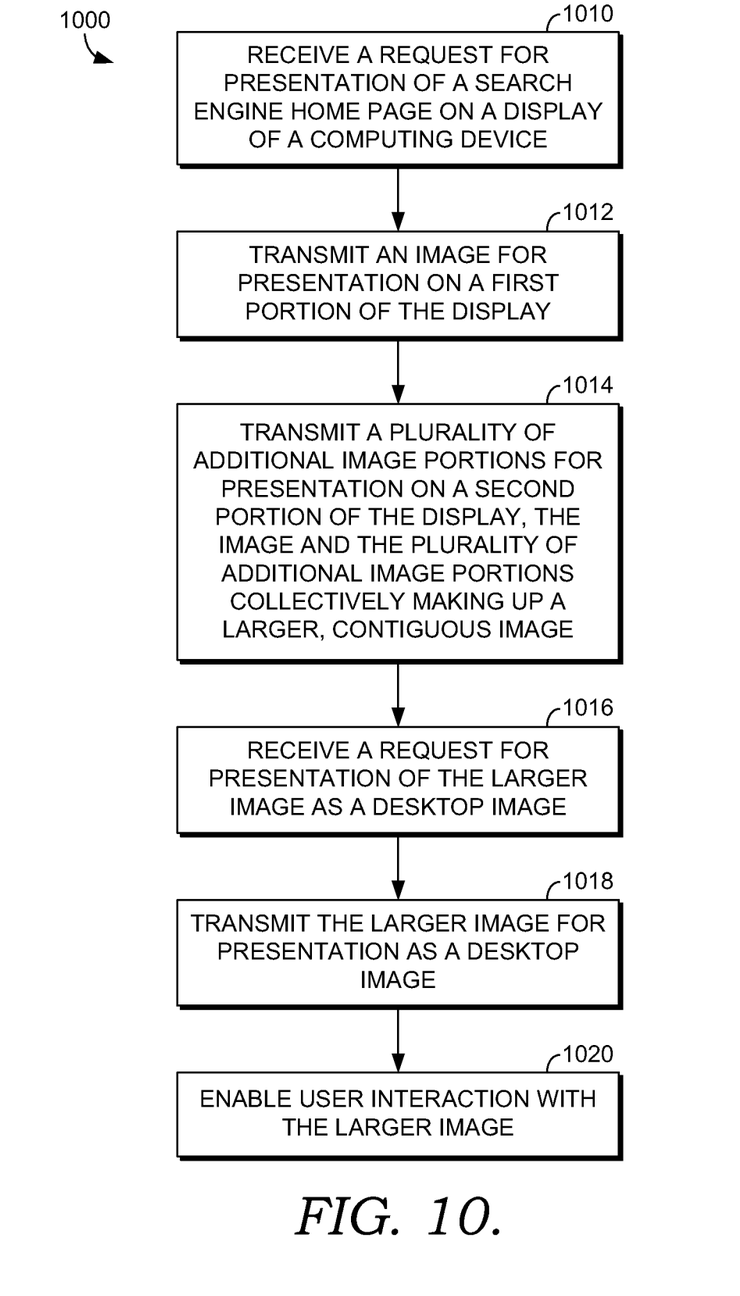
FIG. 10 is a flow diagram showing another exemplary method for enabling immersive, interactive desktop image presentation, in accordance with an embodiment of the present invention.

Turning now to FIG. 10, a flow diagram is illustrated showing an exemplary method 1000 for enabling immersive, interactive desktop image presentation, in accordance with an embodiment of the present invention. Initially, as indicated at block 1010, a request for presentation of a search engine home page on a display associated with a computing device (e.g., display 220 of client computing device 210 of FIG. 2) is received. Upon receipt of such presentation request, an image is transmitted for presentation on at least a first portion of the available display, as indicated at block 1012. In embodiments, the first portion of the available display comprises less than the whole display and the image transmitted for presentation comprises a portion of a larger image. As indicated at block 1014, a plurality of additional image portions is transmitted for presentation on at least a second portion of the available display that differs from the first portion. In embodiments, the image and the plurality of additional image portions collectively comprise the larger image.

As indicated at block 1016, a request for presentation of the larger image as a desktop image is received and, as indicated at block 1018, the larger image is transmitted for presentation as a desktop image on the desktop associated with the computing device. As indicated at block 1020, user interaction is enabled with respect to the desktop image. Such user interaction may include, without limitation, panning, zooming, and the like.

As can be understood, embodiments of the present invention provide systems and methods for enabling immersive, interactive search engine home pages. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 600 of FIG. 6, the method 700 of FIG. 7, the method 800 of FIG. 8 and the method 1000 of FIG. 10 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more hardware memory devices storing computer-useable instructions that, when used by one or more computing devices, cause the one or more computing devices to perform a method for enabling immersive, interactive desktop image presentation, the method comprising:

in response to a request received from a toggle control that navigates a user between viewing a desktop associated with a computing device and viewing a search engine home page displayed via a browser, receiving a request for presentation of a background image of a search engine home page as a desktop image, wherein the background image includes at least one region for enabling user interaction;

transmitting the background image of the search engine home page for presentation as the desktop image on a desktop associated with a computing device; and enabling user interaction with the desktop image, wherein the desktop image is presented as a background of the desktop such that the desktop image is presented behind desktop objects on a graphical user interface.

2. The one or more hardware memory devices of claim 1, wherein the method further comprises:

receiving a request for presentation of the desktop image as the background image of the search engine home page; and transmitting the desktop image for presentation as the background image of the search engine home page.

3. The one or more hardware memory devices of claim 2, wherein the method further comprises providing a toggle control configured to facilitate navigation between the desktop associated with the computing device and the search engine home page.

4. The one or more hardware memory devices of claim 1, wherein enabling user interaction with the desktop image comprises enabling at least one of panning around and zooming into the desktop image.

5. The one or more hardware memory devices of claim 1, wherein the desktop image includes at least one interactive region.

6. The one or more hardware memory devices of claim 5, wherein the at least one interactive region is anchored to a pixel location within the desktop image.

7. The one or more hardware memory devices of claim 5, wherein upon user engagement with the at least one interactive region, the method further comprises navigating the user away from the desktop and into a search experience.

8. The one or more hardware memory devices of claim 1, wherein the desktop image comprises one of a panoramic image and another explorable photo image.

9. A method for enabling immersive, interactive desktop image presentation, the method comprising:

receiving a request for presentation of a search engine home page on a display associated with a computing device;

transmitting an image for presentation on a first portion of the display that comprises less than the whole display, the image comprising a substantially centralized portion of a larger image;

transmitting a plurality of additional image portions for presentation on a second portion of the display that differs from the first portion, the image and the plurality of additional image portions collectively comprising the larger image;

in response to a request received from a toggle control that navigates a user between viewing a desktop associated with a computing device and viewing a search engine home page displayed via a browser, receiving a request for presentation of the larger image as a desktop image, wherein the larger image includes at least one region for enabling user interaction;

transmitting the larger image for presentation as a desktop image on a desktop associated with the computing device; and enabling user interaction with the desktop image, wherein the desktop image is presented as a background of the desktop such that the desktop image is presented behind desktop objects on a graphical user interface.

10. The method of claim 9, wherein the at least one region for enabling user interaction provides additional content when engaged.

11. The method of claim 9, wherein the desktop image includes at least one interactive region anchored to a pixel location within the desktop image, and wherein upon user engagement with the at least one interactive region, the method further comprises navigating away from the desktop and into a search experience.

12. A system for generating immersive, interactive desktop image presentation, the system comprising:

one or more hardware memory devices;

one or more executing instructions to:

A) receive, from a toggle control that navigates a user between viewing a desktop associated with a computing device and viewing a search engine home page displayed via a browser, a request for presentation of a background image of a search engine home page as a desktop image, wherein the background image includes at least one region for enabling user interaction;

B) retrieve and transmit the background image of the search engine home page for presentation as the desktop image on a desktop associated with a computing device; and C) determine whether the browser associated with a computing device is capable of presenting an interactive image as at least a portion of the background image of a search engine home page.

13. The system of claim 12, the one or more processors further executing instructions to receive requests for presentation of search engine home pages.

14. The system of claim 12, wherein the at least one region for enabling user interaction, when engaged, provides additional content.

15. The system of claim 12, the one or more processors further executing instructions to transmit image data for presentation as a desktop image associated with the client computing device.

16. The system of claim 12, the one or more processors further executing instructions to determine whether applicable user-preference settings permit an interactive image presentation as at least a portion of the background of a search engine home page.

17. The system of claim 12, wherein when the one or more processors determine the browser associated with a computing device is not capable of presenting an interactive image as at least a portion of the background image of a search engine home page, the one or more processors further executing instructions to retrieve a static image for presentation on a portion of the available display that is less than the entire display and to transmit such image for presentation.

18. The system of claim 12, wherein when the one or more processors determine the browser associated with a computing device is capable of presenting an interactive image as at least a portion of the background image of a search engine home page, the one or more processors further executing instructions to transmit an interactive image for presentation as at least a portion of the background for search engine home pages.

19. The system of claim 12, further comprising:

an image data store storing searchable image data.

20. The system of claim 19, wherein the image data includes interactive image data.

* * * * *